Patented Nov. 18, 1952

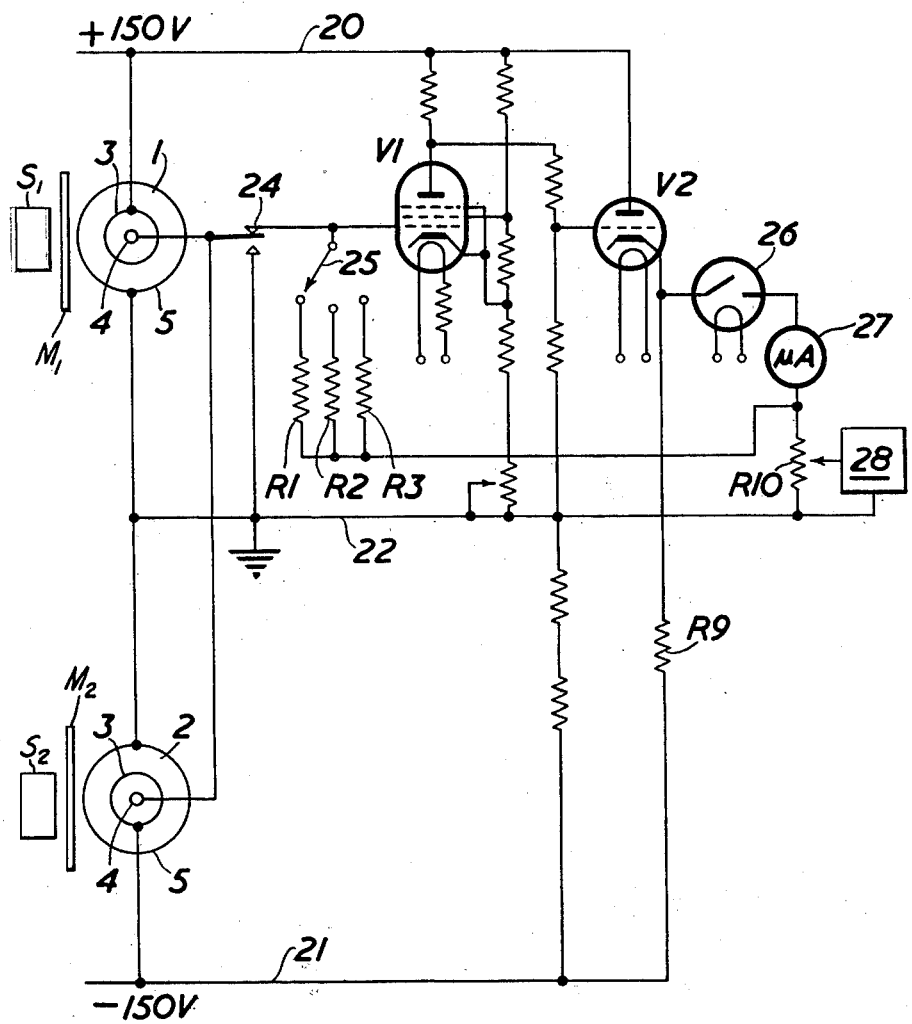

2,618,751

UNITED STATES PATENT OFFICE 2,618,751

APPARATUS FOR GAUGING SHEET MATERIAL

Kenneth Fearnside and Edwin N. Shaw, London, England, assignors to Isotope Developments Limited, London, England, a British company Application November 3, 1950, Serial No. 193,846
In Great Britain November 3, 1949

6 Claims. (Cl. 250—83.6)

This invention relates to apparatus for measuring the thickness or other physical characteristic of sheet material including surface layers or coatings.

It is useful, inter alia, in the manufacture of webs of paper, of linoleum and of metal and plastic sheets and in the application of surface layers and coatings, for monitoring and for regulating the thickness of the spread sheet material.

In producing material in sheet form, difficulty commonly arises in measuring the thickness of the sheet being produced without disturbing production and without harmfully touching the surface of the sheet. The apparatus of the invention provides a solution to this problem by measuring the effect of the sheet in attenuating a beam of radiation.

Furthermore the apparatus of the invention makes use of a comparison method whereby divergence from a standard can be indicated or corrected or both, and whereby also the effects of changing ambient conditions on the accuracy of measurement can be largely eliminated.

The apparatus of the invention comprises two ionisation chambers connected so that their discharge currents pass in opposite directions through a common load resistance, and means for measuring the current in said load resistance.

The ionisation chambers are arranged to be set up in front of separate radio-active sources, the material to be measured being interposed between one ionisation chamber and its associated source, a standard specimen usually of the same material being interposed between the other chamber and source.

The apparatus may be initially balanced to give a zero reading under required conditions by adjusting the spacing between the chambers and sources and where necessary by interposing screens.

When the apparatus is used to regulate thickness or as an aid in maintaining constant thickness, similarity of the ionisation chambers is not essential.

In the preferred form of the invention however, similar ionisation chambers are used so that the effect of ambient conditions common to both chambers is neutralised.

The ionisation chamber circuit may consist of a high-voltage D. C. supply source with positive and negative terminals at equal potentials above and below ground potential respectively, the two ionisation chambers having their inner electrodes connected together and through the common load resistance to ground, and their outer electrodes connected respectively to the positive and negative supply terminals.

The load resistance, which may be changed in value to give different sensitivities, needs in most cases to be of a high value (e. g. $10^{10}$ to $10^{12}$ ohms) to suit the ionisation chambers, and current through it is then measured by measuring its terminal voltage by means of an electrometer.

The electrometer may consist of an electrometer valve (i. e. an electronic valve having a high input impedance) followed by an amplifier and a current meter.

A measuring instrument embodying the invention will now be described with reference to the accompanying drawing which is a circuit diagram showing the components of the instrument and their connections.

Referring to the drawing, two similar ionisation chambers 1, 2 are employed, each of the type comprising a tubular metal shell constituting an outer electrode 3, the shell having an end window of small stopping effect on the radiation employed, the shell also being gas filled and containing an axial wire electrode 4. The chambers are arranged adjacent to (for example, vertically above) radiation sources $S_1$ and $S_2$ respectively, provision being made for adjusting the spacing and for introducing sheet material $M_1$ and $M_2$ between each chamber and its associated source. Each chamber is housed in a grounded radiation-proof metal casing 5.

The outer electrodes 3 of the ionisation chambers 1, 2 are connected respectively to D. C. supply lines 20, 21 of opposite polarity with respect to the grounded line 22. In the circuit shown lines 20 and 21 have voltages of $+150$ and $-150$ respectively, set up for example by means of a rectifier and smoothing network supplied from a mains-fed transformer in a conventional manner.

The inner electrodes 4 of the ionisation chambers are connected together and through contacts 24 for zero checking and a selector switch 25 for sensitivity adjustment, to one of a series of high resistances $R_1$, $R_2$, $R_3$. The values of these resistances may be $10^{10}$, $10^{11}$, $10^{12}$, ohms respectively. Each resistance has a connection to ground through a resistance $R_{10}$.

The ionisation chambers are thus connected so that their discharge currents pass in opposite directions through one of the load resistances $R_1$, $R_2$, $R_3$.

The current in the load resistance is measured by incorporating the load resistance as the input resistance in an electrometer circuit comprising an electrometer valve $V_1$ directly coupled in a conventional manner to a power amplifier valve $V_2$ connected as a cathode follower to establish across a cathode load resistance $R_9$ a voltage which in relation to ground is proportional to the current in the input resistance. This voltage with respect to ground is in the circuit shown applied through a time delay switch 26 to a meter 27 in series with resistance R10. A current meter of 10,000 ohms resistance reading up to 500μ A in both directions from the zero current condition is suitable in the specific circuit shown. Resistance R10 serves as a negative feed-back resistance for improving the linearity and stability of the circuit in well known manner. It serves also to provide a voltage for application to a recorder 28.

In order to produce sheet material of standard thickness, a standard sheet is inserted between one source and one ion chamber, and the other source and ion chamber are mounted so that the sheet being produced passes between them. The sources are chosen so that the current in each ionisation chamber is approximately $10^{-9}$ amps. It is not necessary to have the sources of exactly the same strength as the currents can be balanced, during the setting up of the instrument, by adjusting the spacing between one of the chambers and its source. The electrometer circuit shown is capable of measuring currents down to $5 \times 10^{-12}$ amps. By its means, the difference between the ionisation chamber currents may be measured to within ½%.

Under working conditions, the electrometer is biased so that the indicating meter reads zero when the sheet being produced is of the required thickness, normally the standard thickness. Any departure from the required thickness causes the meter to read to one side or the other of zero, and the machine operator has merely to adjust the thickness control to return the meter to zero. The meter voltage may be used as an error voltage for application to servo-mechanism effective to regulate the thickness automatically. The recorder provides a continuous record of thickness deviations.

A condenser may be introduced to the electrometer input circuit to adjust the time constant of response. A time constant of 5 seconds has been found convenient to avoid flutter due to texture, embossings etc., for example patterns stamped on linoleum sheet.

For thickness measurement of paper, plastic sheet, linoleum and most organic materials, a radio-active source emissive of beta rays only is appropriate. Such a source may be in the form of a layer of a radio-active isotope upon a metal disc.

The isotope is chosen according to the weight per unit area of the measured sheet; sulphur 35 is suitable for sheet material of the order of 10 milligrams per square centimetre, calcium 45 for 25 mgm./sq. cm., thallium 204 for 200 mgm./sq. cm. and strontium 90 for 700 mgm./sq. cm.

For gauging of metal sheet, soft gamma sources need to be used together with an appropriate design of ionisation chamber.

Some of the advantages of the opposed connection of the ion chambers are as follows:

Firstly, it is possible to read differences in weight per unit area of 1% whereas a single chamber reading thickness directly may give rise to an error of 5–10% or more due to zero drift and changes in sensitivity.

Secondly, the high value grid resistors are liable to change by up to 10% in conditions of varying humidity and temperature. Since both currents pass through the same resistor the variation produces only a second order effect on the accuracy of the gauge in reading departures from zero and none at all if the operator keeps the meter reading at zero.

Thirdly, in the selection of gamma sources it frequently happens that an isotope emitting the required soft gamma ray also emits a hard gamma ray which is very little attenuated by the sheet being gauged. The effect of this harder gamma ray is cancelled out.

Fourthly, in the case of materials having inclusions such as titanium or lead a calibration of weight per unit area made by some other material does not hold good. A fresh calibration would be necessary for each type of material if direct reading by means of a single chamber were employed. By having an inter-changeable standard this sort of trouble is avoided.

Fifthly, allowance can readily be made for backing sheets and any supporting or screening material which it may be convenient to introduce. The instrument can be brought to a balanced condition so that it measures variations in thickness of one of a number of layers, for example variations in thickness of a coating.

The instrument described may be put to use in a variety of different ways. For the monitoring or regulation of thickness of a coating upon a backing sheet, for example of carbon upon carbon paper, the uncoated sheet is passed one chamber and source, and the coated sheet is passed between the other chamber and source. The thickness of the coating may be measured as an unbalanced voltage; or the unbalance voltage may be backed off by a steady E. M. F. determined by previously comparing standard coated and uncoated specimens; or a balanced condition may be obtained in the response of the ionisation chambers by choice of source spacing and/or auxiliary screens. For example a standard coated sheet may be disposed alongside the travelling uncoated sheet in front of one ionisation chamber and a standard uncoated sheet alongside the travelling coated sheet in front of the other ionisation chamber.

We claim:

1. A device for measuring or indicating a physical characteristic of sheet material, and comprising two radiation sources for emitting beta rays, two ionisation chambers each arranged to receive radiation from a different one of said sources, one only of the said chambers being arranged to receive radiation passing through the sheet of material under test, an electrometer valve having an input circuit including a resistor, means for applying differentially to said resistor output currents from said ionization chambers, and an indicating or measuring instrument responding to the output of said valve.

2. A device according to claim 1, wherein the second ionisation chamber is arranged to respond to radiation passing through a second, standard, sheet of material.

3. A device in accordance with claim 1, wherein the input circuit of said valve is connected between a grid thereof and ground; said ionization chambers each comprise a grounded radiation-proof metal casing having a radiation-admitting aperture, and an inner and an outer electrode; the inner electrodes being connected to each other and to the grid ends of said resistor, whereby on applying direct current potentials of opposite polarity to the respective outer electrodes the output currents of the two chambers are caused to pass in opposite directions through said resistor as a common load impedance.

4. A device according to claim 3, wherein the input circuit of said electrometer valve includes a plurality of resistors of different values and switch means adjustable to connect a selected one of said resistors between the valve grid and ground, whereby the value of the load impedance is variable to vary the sensitivity of the device.

5. A device according to claim 3, wherein said input circuit includes a resistance in series between said resistor and ground, said resistance being also connected in series between said instrument and ground, whereby it serves as a negative feed-back resistance for said valve to improve the linearity and stability of the device.

6. A device according to claim 5, in combination with a recorder connected to and energized by the voltage drop developed across said resistance.

KENNETH FEARNSIDE.
EDWIN N. SHAW.

REFERENCES CITED

The following references are of record in the file of this patent:

UNITED STATES PATENTS

| Number | Name | Date |
|---|---|---|
| 2,264,725 | Shoupp et al. | Dec. 2, 1941 |
| 2,405,572 | Friedman | Aug. 13, 1946 |
| 2,503,075 | Smith | Apr. 4, 1950 |